United States Patent
Desai et al.

(10) Patent No.: US 9,843,485 B2
(45) Date of Patent: Dec. 12, 2017

(54) MONITORING DYNAMIC NETWORKS

(71) Applicant: International Business Machines Corporation, Armonk, NY (US)

(72) Inventors: Nirmit V. Desai, Yorktown Heights, NY (US); Ting He, Piermont, NY (US); Liang Ma, White Plains, NY (US)

(73) Assignee: International Business Machines Coprporation, Armonk, NY (US)

( * ) Notice: Subject to any disclaimer, the term of this patent is extended or adjusted under 35 U.S.C. 154(b) by 101 days.

(21) Appl. No.: 14/954,188

(22) Filed: Nov. 30, 2015

(65) Prior Publication Data

US 2017/0155557 A1 Jun. 1, 2017

(51) Int. Cl.
*H04L 12/28* (2006.01)
*H04L 12/24* (2006.01)
*H04L 12/26* (2006.01)
*H04L 29/08* (2006.01)

(52) U.S. Cl.
CPC ............ *H04L 41/147* (2013.01); *H04L 41/12* (2013.01); *H04L 41/145* (2013.01); *H04L 43/045* (2013.01); *H04L 43/08* (2013.01); *H04L 67/10* (2013.01)

(58) Field of Classification Search
CPC combination set(s) only.
See application file for complete search history.

(56) References Cited

U.S. PATENT DOCUMENTS

| 7,706,286 | B2 | 4/2010 | Karloff |
| 7,729,269 | B1 * | 6/2010 | Nucci ................. H04L 43/0882 370/238 |
| 7,876,792 | B2 | 1/2011 | Wong et al. |
| 2006/0218259 | A1 | 9/2006 | Benjelloun Touimi et al. |
| 2012/0163191 | A1 | 6/2012 | Tokimizu et al. |
| 2015/0023174 | A1 | 1/2015 | Dasgupta et al. |
| 2015/0029870 | A1 * | 1/2015 | Bisdikian ................ H04L 43/12 370/250 |
| 2015/0092597 | A1 | 4/2015 | Guo et al. |
| 2015/0319190 | A1 * | 11/2015 | Kruglick ................. H04L 45/02 726/11 |

OTHER PUBLICATIONS

Ma et al, Monitor Placement for Maximal Identifiability in Network Tomograph, IEEE, 9 pages, Jul. 2014.*

(Continued)

*Primary Examiner* — Frank Duong
(74) *Attorney, Agent, or Firm* — Yee & Associates, P.C.; Jennifer R. Davis

(57) ABSTRACT

Monitoring a network is provided. A set of predicted network topology snapshot graphs of nodes in the network are generated based on a set of network topology prediction models for the network. A subset of the nodes is selected as monitors in the set of predicted network topology snapshot graphs of the network so that each link in a set of selected network links is identifiable using end-to-end measurements between the monitors. Network states of interest are determined in the set of selected network links within a selected time window based on the end-to-end measurements between the monitors.

20 Claims, 10 Drawing Sheets

(56) References Cited

OTHER PUBLICATIONS

Mell et al., "The NIST Definition of Cloud Computing," National Institute of Standards and Technology Special Publication 800-145, Sep. 2011, 7 pages.
Clegg et al., "On the Selection of Management/Monitoring Nodes in Highly Dynamic Networks," IEEE Transactions on Computers, vol. 62, No. 6, Jun. 2013, pp. 1207-1220.
"Traceroute(8) Linux Man Page," http://linux.die.net/man/8/traceroute, accessed Nov. 30, 2015, 7 pages.
Duffield et al., "Network Loss Tomography Using Striped Unicast Probes," IEEE/ACM Transactions on Networking, vol. 14, No. 4, Aug. 2006, pp. 1-14.
Zhao et al., "Towards Unbiased End-to-End Network Diagnosis," ACM SIGCOMM Computer Communication Review, vol. 36. No. 4, Sep. 2006, 12 pages.
Xia et al., "Inference of Link Delay in Communication Networks," IEEE Journal on Selected Areas in Communications, vol. 24, No. 12, Dec. 2006, pp. 2235-2248.
Hu et al, "Locating Internet Bottlenecks: Algorithms, Measurements, and Implications," ACM SIGCOMM Computer Communication Review, vol. 34, No. 4, Aug. 2004, 14 pages.
Duffield, "Network Tomography of Binary Network Performance Characteristics," IEEE Transactions on Information Theory, vol. 52, No. 12, Dec. 2006, pp. 1-32.
Bejerano et al., "Robust Monitoring of Link Delays and Faults in IP Networks," IEEE/ACM Transactions on Networking vol. 14, No. 5, Oct. 2006, 11 pages.
Kumar et al., "Practical Beacon Placement for Link Monitoring Using Network Tomography," IEEE Journal on Selected Areas in Communications, vol. 24, No. 12, Dec. 2006, pp. 1-14.
Horton et al., "On the Number of Distributed Measurement Points for Network Tomography," Proceedings of the Third ACM SIGCOMM Conference on Internet Measurement, Oct. 27-29, 2003, 6 pages.
Nguyen et al., "Active Measurement for Multiple Link Failures Diagnosis in IP Networks," Passive and Active Network Measurement, vol. 13, Apr. 2004, 10 pages.
Stanic et al., "Active Monitoring and Alarm Management for Fault Localization in Transparent All-Optical Networks," IEEE Transactions on Network and Service Management, vol. 7, No. 2, Jun. 2010, pp. 118-131.
Wang et al., "Group Mobility and Partition Prediction in Wireless Ad-Hoc Networks," IEEE International Conference on Communications, vol. 2, Apr. 2002, 5 pages.
Mousavi et al., "Mobility Aware Distributed Topology Control in Mobile Ad-Hoc Networks with Model Based Adaptive Mobility Prediction," Third IEEE International Conference on Wireless and Mobile Computing, Networking and Communications, Oct. 8-10, 2007, 8 pages.
Ho et al., "Stochastic Model and Connectivity Dynamics for VANETs in Signalized Road Systems," IEEE/ACM Transactions on Networking, vol. 19, No. 1, Feb. 2011, pp. 195-208.
Ma et al., "Identifiability of Link Metrics Based on End-to-End Path Measurements," Proceedings of the 2013 Conference on Internet Measurement Conference, Oct. 23-25, 2013, 14 pages.
Ma et al., "Node Failure Localization via Network Tomography," Proceedings of the 2014 Conference on Internet Measurement Conference, Nov. 5-7, 2014, 14 pages.

* cited by examiner

MONITORING DYNAMIC NETWORKS

This invention was made with Government support under Contract No.: W911NF-06-3-0001 awarded by Army Research Office (ARO). The Government has certain rights in this invention.

BACKGROUND

1. Field

The disclosure relates generally to dynamic cloud networks comprising mobile data processing systems and more specifically to monitoring network states of interest in a set of selected network links between mobile data processing nodes in a dynamic cloud network based on end-to-end measurements between monitors with network topologies changing over time.

2. Description of the Related Art

Advances in portable data processing devices, such as smart phones, handheld computers, and sensors, and abundant sensing data on these portable data processing devices motivate distributed data processing on or near these portable data processing devices at the edge of communication networks. As one example, in cloud networks data processing capabilities are extended from the cloud core to the cloud edges (e.g., cloudlet/fog/edge computing) connected to the cloud core via wireless links. As another example, in Internet of Things (IoT) and ad hoc network computing environments clusters of ad hoc portable data processing devices within communication range of each other form an ad-hoc cloud network to jointly process sensing data. In both examples, the solicitor of data processing (e.g., cloud provider/client, IoT analytics client, ad-hoc computing client, and the like) needs to obtain timely knowledge of network state (e.g., link performance) so as to optimize workload scheduling. However, such networks are generally organized in an ad hoc manner and are susceptible to runtime changes (e.g., due to node mobility and wireless channel fluctuation), which imposes challenges in designing a monitoring infrastructure to monitor these networks.

SUMMARY

According to one illustrative embodiment, a computer-implemented method for monitoring a network is provided. A computer generates a set of predicted network topology snapshot graphs of nodes in the network based on a set of network topology prediction models for the network. The computer selects a subset of the nodes as monitors in the set of predicted network topology snapshot graphs of the network so that each link in a set of selected network links is identifiable using end-to-end measurements between the monitors. The computer determines network states of interest in the set of selected network links within a selected time window based on the end-to-end measurements between the monitors. According to other illustrative embodiments, a computer system and computer program product for monitoring a network are provided.

DETAILED DESCRIPTION

Figure 1:
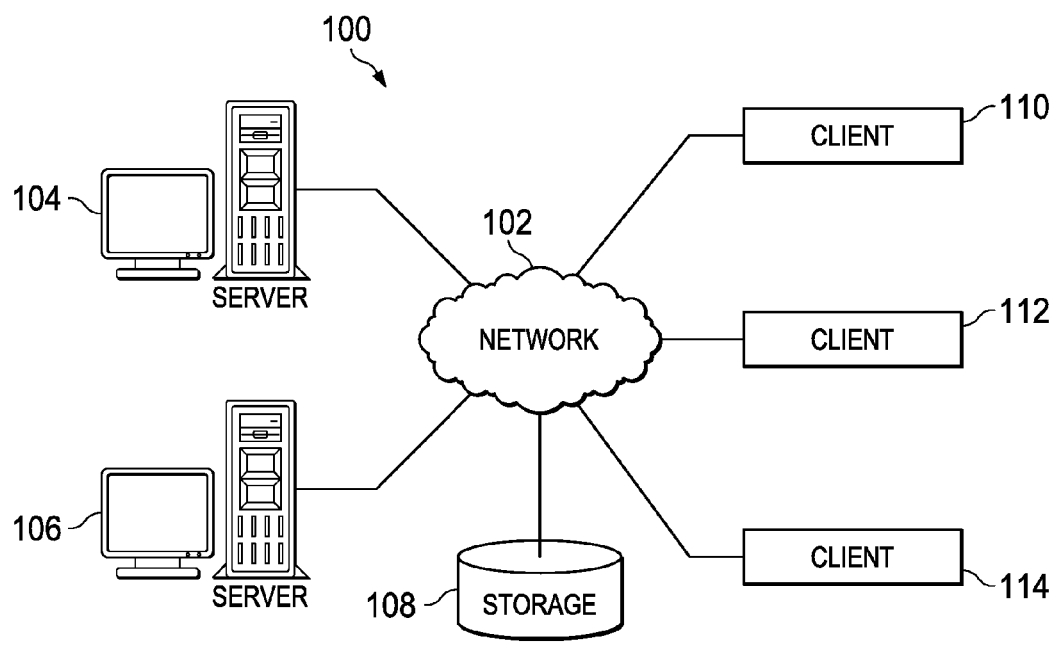
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a service of monitoring network states of a set of selected network links of interest between mobile data processing nodes in a dynamic cloud network based on end-to-end measurements between monitors with network topologies changing over time.

Client 110, client 112, and client 114 also connect to network 102. Clients 110, 112, and 114 are clients of server 104 and server 106. Server 104 and server 106 may provide information, such as boot files, operating system images, virtual machine images, and software applications to clients 110, 112, and 114.

In this example, clients 110, 112, and 114 may each represent a dynamic cloud of mobile data processing systems, such as laptop computers, tablet computers, handheld computers, smart phones, smart watches, personal digital assistants, gaming devices, sensors, or any combination thereof. Further, server 104 and server 106 may select a subset of mobile data processing systems as monitors within each dynamic cloud of mobile data processing systems for monitoring network states of a set of selected network links of interest between mobile data processing systems in each dynamic cloud network.

Storage 108 is a network storage device capable of storing any type of data in a structured format or an unstructured format. The data stored in storage 108 may be, for example, network topology prediction models, pre-defined look-ahead time windows, predicted network topology snapshot graphs of mobile data processing nodes in dynamic cloud networks, lists of network links of interest in dynamic cloud networks, historical network topology changes in dynamic cloud networks, lists of selected monitors in dynamic cloud networks, end-to-end measurements between monitors in dynamic cloud networks, and determined network states of network links of interest in dynamic cloud networks. Further, storage unit 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
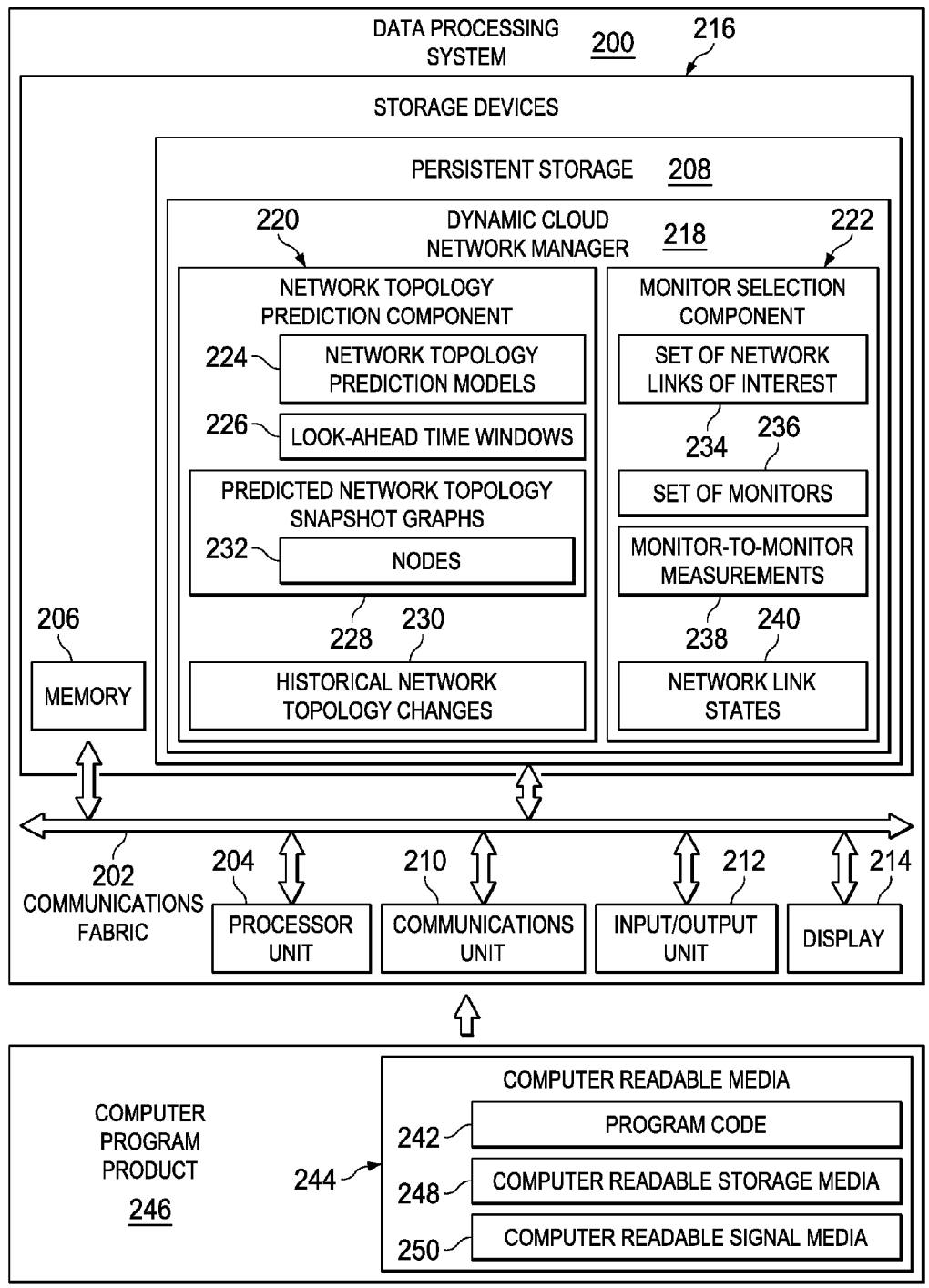
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or a data processing system of client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores dynamic cloud network manager 218. Dynamic cloud network manager 218 controls the monitoring of network states of a set of selected network links of interest between mobile data processing nodes in a dynamic cloud network based on end-to-end measurements between monitors with network topologies changing over time. It should be noted that even though dynamic cloud network manager 218 is illustrated as residing in persistent storage 208, in an alternative illustrative embodiment, dynamic cloud network manager 218 may be a separate component of data processing system 200. For example, dynamic cloud network manager 218 may be a hardware component coupled to communication fabric 202 or a combination of hardware and software components.

In this example, dynamic cloud network manager 218 includes network topology prediction component 220 and monitor selection component 222. However, illustrative embodiments are not limited to such. In other words, in alternative illustrative embodiments, dynamic cloud network manager 218 may include more or fewer components than illustrated. For example, alternative illustrative embodiments may separate network topology prediction component 220 and/or monitor selection component 222 into two or more components or may combine topology prediction component 220 and monitor selection component 222 into one component.

In this example, network topology prediction component 220 includes network topology prediction models 224, look-ahead time windows 226, predicted network topology snapshot graphs 228, and historical network topology changes 230. Network topology prediction component 220 utilizes network topology prediction models 224 to predict the topology of mobile data processing nodes comprising a dynamic cloud network. Network topology prediction models 224 may be based on mobile data processing node trajectory constraints or historical mobile data processing node mobility patterns. Network topology prediction models 224 may be a set of one or more network topology prediction models.

Look-ahead time windows 226 represent a set of two or more different size periods of time or time intervals that are pre-defined by a system administrator, for example. Network topology prediction component 220 selects one look-ahead time window in look-ahead time windows 226 based on network parameters and desired network monitoring performance and cost within the period of time corresponding to the selected look-ahead time window. Network topology prediction component 220 utilizes the selected look-ahead time window to determine over what period of time network topology prediction component 220 is to generate predicted network topology snapshot graphs 228.

Predicted network topology snapshot graphs 228 are a set of two or more graphs representing the estimated locations of nodes 232 within the dynamic cloud network during the period of time corresponding to selected look-ahead time window. Nodes 232 represent the plurality of mobile data processing systems that comprise the dynamic cloud network.

Historical network topology changes 230 represent previous changes to the dynamic cloud network and/or other similar types of dynamic cloud networks over time. Network topology prediction component 220 may utilize historical network topology changes 230 in addition to, or instead of, using network topology prediction models 224 to generate predicted network topology snapshot graphs 228.

In this example, monitor selection component 222 includes set of network links of interest 234, set of monitors 236, monitor-to-monitor measurements 238, and network link states 240. Set of network links of interest 234 represent the network links between nodes 232 that are of interest in monitoring for data transmission performance. For example, set of network links of interest 234 may be network links serving critical applications executing in the dynamic cloud network. Set of monitors 236 represent a subset of nodes 232 in predicted network topology snapshot graphs 228, which monitor selection component 222 selects to be monitors within the dynamic cloud network for monitoring link performance of set of network links of interest 234. Monitor selection component 222 selects the subset of nodes 232 so that set of network links of interest 234 are always identifiable in predicted network topology snapshot graphs 228. In other words, monitor selection component 222 utilizes set of network links of interest 234 to calculate how to deploy set of monitors 236 within the dynamic cloud network.

Monitor-to-monitor measurements 238 represent end-to-end network path performance that is an accumulation of corresponding link metrics between set of monitors 236. Dynamic cloud network manager 218 utilizes monitor-to-monitor measurements 238 between set of monitors 236 to determine network link states 240. Network link states 240 represent the different states of set of network links of interest 234 within the dynamic cloud network during the time period corresponding to the selected look-ahead time window. Dynamic cloud network manager 218 may, for example, reconfigure the dynamic cloud network in response to network link states 240 being equal to or greater than predefined threshold values for delay, jitter, and loss rates on set of network links of interest 234 within the dynamic cloud network during the time period corresponding to the selected look-ahead time window. By reconfiguring the network in response to determining that network link states 240 are equal to or greater than the predefined threshold values, dynamic cloud network manager 218 may improve the functioning of the dynamic cloud network.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It should be understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the provider of the service. Broad network access provides for capabilities that are available over a network and accessed through standard mechanisms, which promotes use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
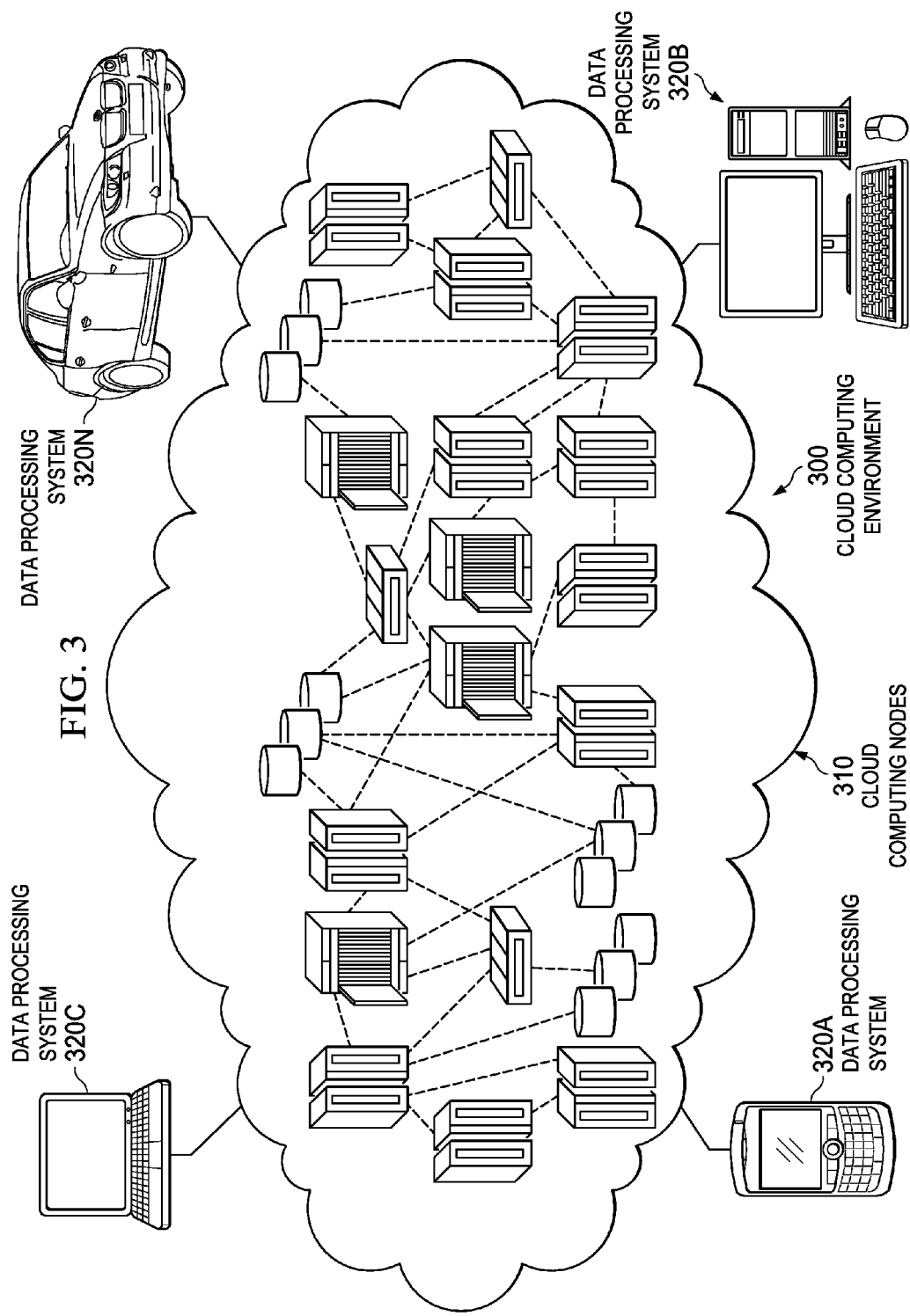
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local data processing systems used by cloud consumers may communicate. Cloud computing nodes 310 may be, for example, server 104 and server 106 in FIG. 1. Local data processing systems that communicate with cloud computing nodes 310 include data processing system 320A, which may be a personal digital assistant or a smart phone, data processing system 320B, which may be a desktop computer or a network computer, data processing system 320C, which may be a laptop computer, and data processing system 320N, which may be a computer system of an automobile. Data processing systems 320A-320N may be, for example, data processing systems of clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as services without requiring the cloud consumers to maintain these resources on their local data processing systems, such as data processing systems 320A-320N. It is understood that the types of data processing devices 320A-320N are intended to be examples only and that cloud computing nodes 310 and cloud computing environment 300 can communicate with any type of computerized device over any type of network and/or network addressable connection using a web browser, for example.

Figure 4:
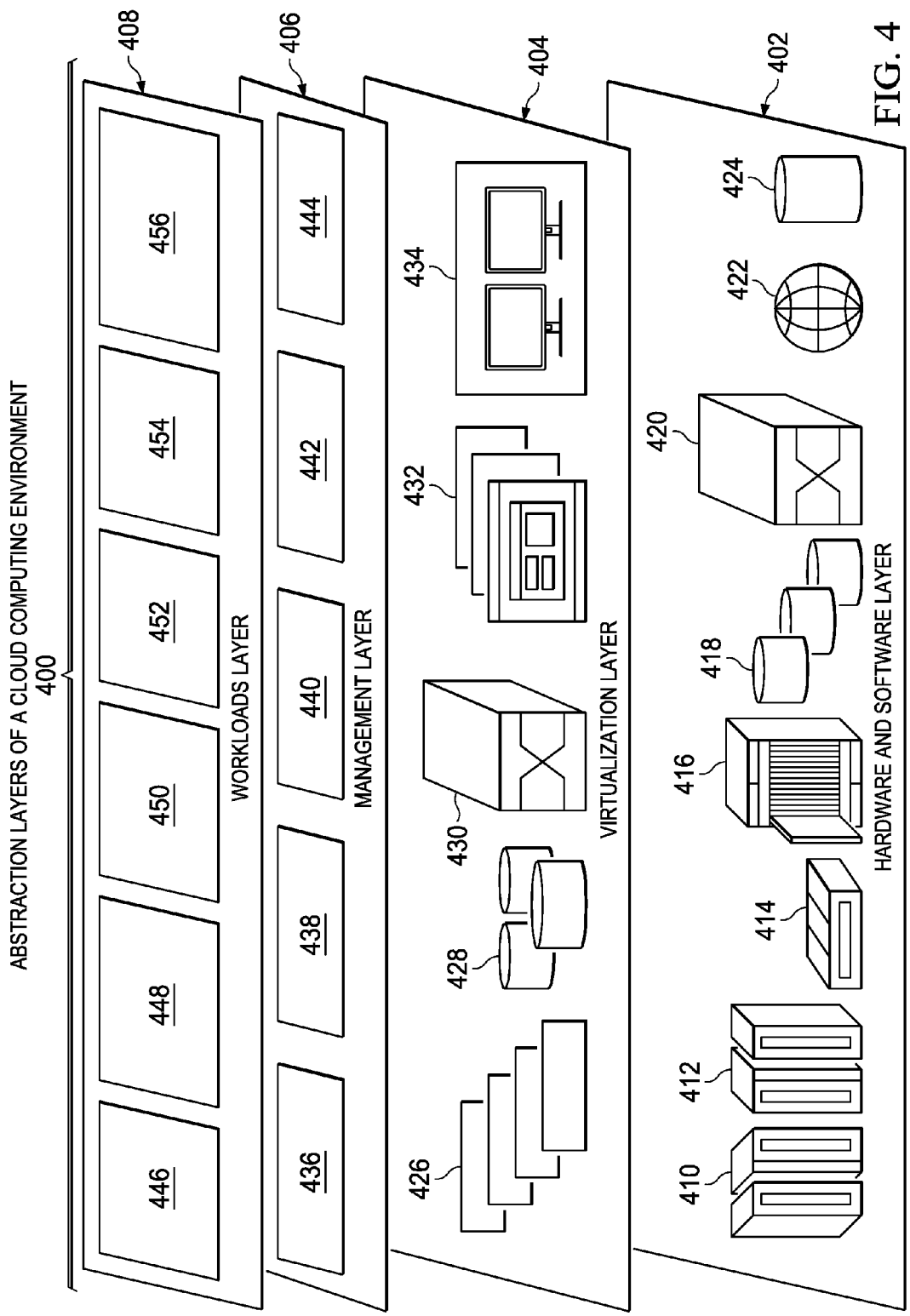
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

In this example, abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430 including virtual private networks; virtual applications and operating systems 432; and virtual machines 434.

Management layer 406 may provide a plurality of different management functions, such as, for example, resource provisioning 436, metering and pricing 438, security and user portal 440, service level management 442, and virtual machine environment management 444. Resource provisioning 436 dynamically procures computing resources and other resources, which are utilized to perform workloads or tasks within the cloud computing environment. Metering and pricing 438 provides cost tracking as resources are utilized within the cloud computing environment and billing for consumption of these resources. In one example, these resources may comprise application software licenses. Security of security and user portal 440 provides identity verification for cloud consumers and workloads, as well as protection for data and other resources. User portal of security and user portal 440 provides access to the cloud computing environment for cloud consumers and system administrators. Service level management 442 provides cloud computing resource allocation and management such that required service levels are met based on service level agreements. Dynamic cloud network management 444 provides management of monitoring network states of a set of selected network links of interest between mobile data processing nodes in a dynamic cloud network based on end-to-end measurements between monitors with network topologies changing over time.

Workloads layer 408 provides the functionality of the cloud computing environment. Example workloads and functions provided by workload layer 408 may include mapping and navigation 446, software development and lifecycle management 448, virtual classroom education delivery 450, data analytics processing 452, transaction processing 454, and monitoring network states of a set of selected network links of interest between mobile data processing nodes in a dynamic cloud network 456.

In the course of developing illustrative embodiments, it was discovered that existing approaches for monitoring link state in a network can be classified into two categories: 1) direct measurement using control-plane tools; and 2) indirect measurement using tomography techniques. Direct link/node measurement generates a large amount of undesirable probing traffic to a network. In addition, such an approach requires full access to the control-plane information and, therefore, this approach cannot be widely supported in a complex cloud environment due to security issues. Moreover, direct measurement relies on active response by network elements upon receiving requests. However, in a dynamic edge cloud network environment it is possible that these requests or responses cannot reach their destination due to node mobility. Therefore, these requests must be resent, which potentially causes more traffic to the dynamic edge cloud network.

In contrast, tomography approaches of indirect measurement only use path-level measurements to estimate the internal network states of interest (i.e., obtain the indirect fine-grained link/node states by parsing the aggregated path-level, coarse-grained information revealed directly to network operators), which does not rely on collecting all active responses. As a result, tomography approaches are highly applicable to a dynamic cloud network environment. Considering the dynamics of the edge of a cloud network, monitors within the dynamic cloud network, which can conduct path measurements, are regarded as valuable assets. Therefore, an efficient monitoring infrastructure should minimize the total number of monitors needed to monitor the network states of a selected set of network links. However, prior work regarding link state estimation and node state estimation focuses on minimizing the ambiguity in determining the network states (i.e., best-effort solution without a performance guarantee) in a static cloud network (i.e., a network topology that remains stable over a relatively long period of time). Moreover, even in static cloud networks where constructing a monitoring infrastructure using a minimum number of monitors is an NP-hard problem when round-trip or open shortest path first (OSPF)-like routing protocols are used for path measurements, the corresponding heuristic solutions cannot address the problem of building efficient monitoring infrastructures in dynamic edge cloud networks.

Illustrative embodiments utilize a monitoring infrastructure of a selected subset of nodes as monitors that can collect and share measurements of network state within a dynamic cloud network. In this regard, illustrative embodiments provide a robust and less expensive monitoring infrastructure that can timely and accurately determine network states in dynamic cloud networks for efficient in-network computation. Without the monitoring infrastructure of illustrative embodiments, mobile computing resources in the edge of a dynamic cloud network may be ill-scheduled and a large amount of data at the cloud periphery may be lost even before being processed. Using illustrative embodiments, cloud providers may benefit from understanding the behaviors of mobile nodes and dynamic cloud network evolvement by leveraging such a monitoring infrastructure to monitor the entire dynamic cloud network or sub-networks of interest with low cost to make better scheduling/optimization decisions.

Illustrative embodiments utilize a tomography-based monitoring infrastructure that selects a set of monitors for inferring network states of interest in dynamic cloud networks. The tomography-based monitoring infrastructure may include components that: 1) according to application requirements, determine sub-networks within a dynamic cloud network containing the network states of interest (e.g., containing network links serving critical applications); the special case is that network states in the entire dynamic network are of interest for monitoring; 2) predict network topology snapshots of nodes comprising a dynamic cloud network within a selected look-ahead time window based on a set of one or more selected network topology prediction models, where the monitoring infrastructure selects a size of the look-ahead time window (T) taking into account the tradeoff between network operation cost, network reconfiguration cost, and network topology prediction accuracy (e.g., a larger size of T results in lower prediction accuracy and a larger number of nodes being selected as monitors, which results in higher monitoring infrastructure cost, while a smaller size of T results in higher network reconfiguration cost due to frequent reselection of monitors); the monitoring infrastructure selects the set of network topology prediction models based on network properties, such as, for example, static wired, static wireless, or dynamic wireless, and available knowledge of network dynamics; 3) using the predicted network topology snapshots of nodes in the selected look-ahead time window T, select a set of monitors that ensure all network states of interest are uniquely determinable using end-to-end measurements between monitors throughout the selected look-ahead time window T; and 4) repeat 2 and 3 above at the end of the current look-ahead time window T, such that the monitoring infrastructure selects a new set of monitors for identifying the network states of interest in the next look-ahead time window T.

Figure 5:
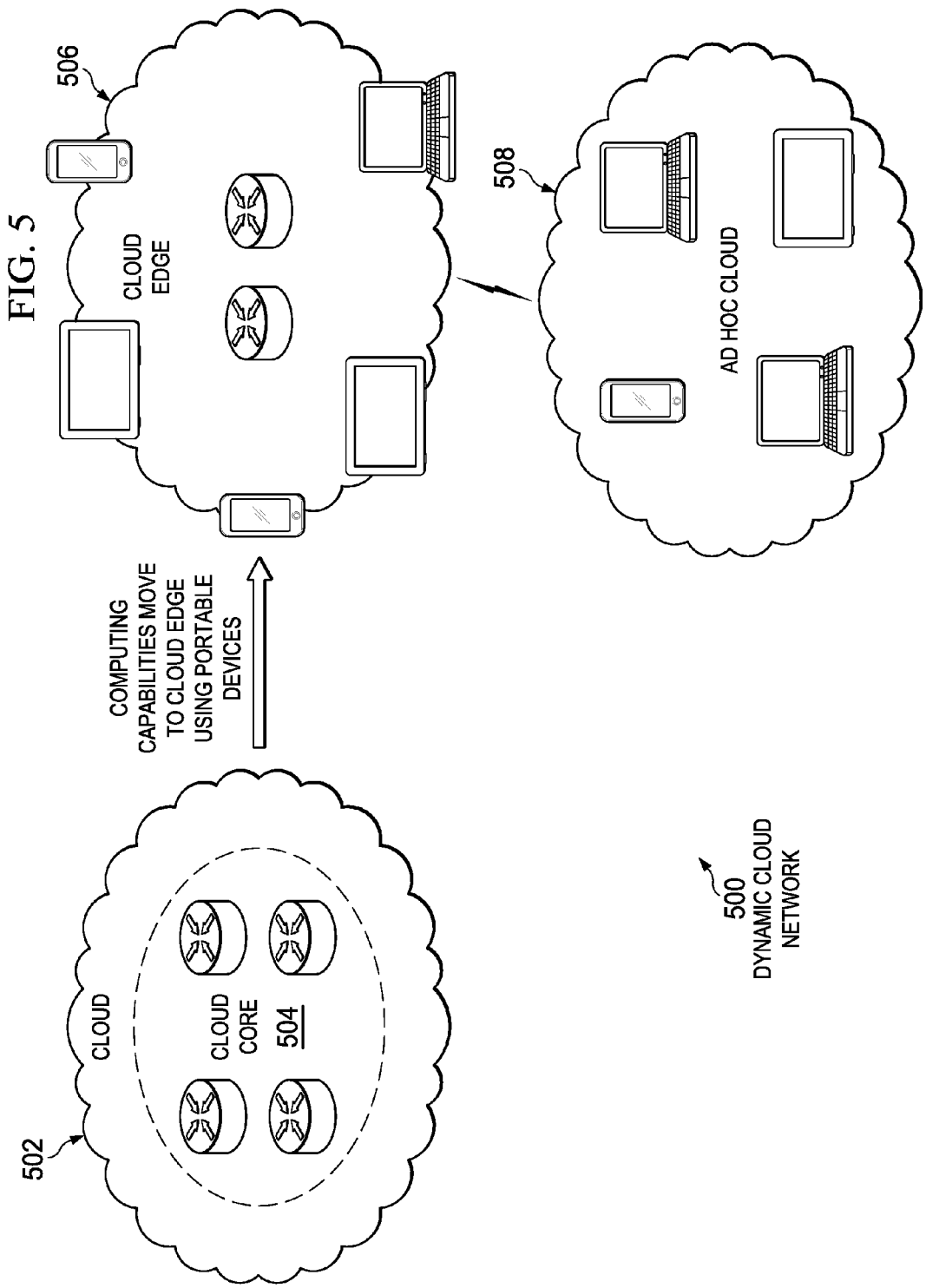
FIG. 5 is a diagram of an example of a dynamic cloud network in accordance with an illustrative embodiment.

With reference now to FIG. 5, a diagram of an example of a dynamic cloud network is depicted in accordance with an illustrative embodiment. Dynamic cloud network 500 represents a cloud network comprising a plurality of portable data processing system devices. Dynamic cloud network 500 includes cloud 502. Cloud 502 represents a cloud computing environment, such as cloud computing environment 300 in FIG. 3. Cloud 502 includes cloud core 504. Cloud core 504 may be, for example, cloud computing nodes 310 in FIG. 3.

Cloud 502's computing capabilities may move to cloud edge 506 using the plurality of portable data processing system devices. The plurality of portable data processing system devices may be, for example, smart phones, handheld computers, laptop computers, personal digital assistants, gaming devices, or any combination thereof that are connected to cloud 502, such as data processing systems 320A-320N connected to cloud computing environment 300 in FIG. 3. In addition, the plurality of portable data processing system devices or a subset of the plurality of portable data processing system devices may form ad hoc cloud 508 by wirelessly connecting to one another to perform a set of one or more data processing tasks.

Figure 6:
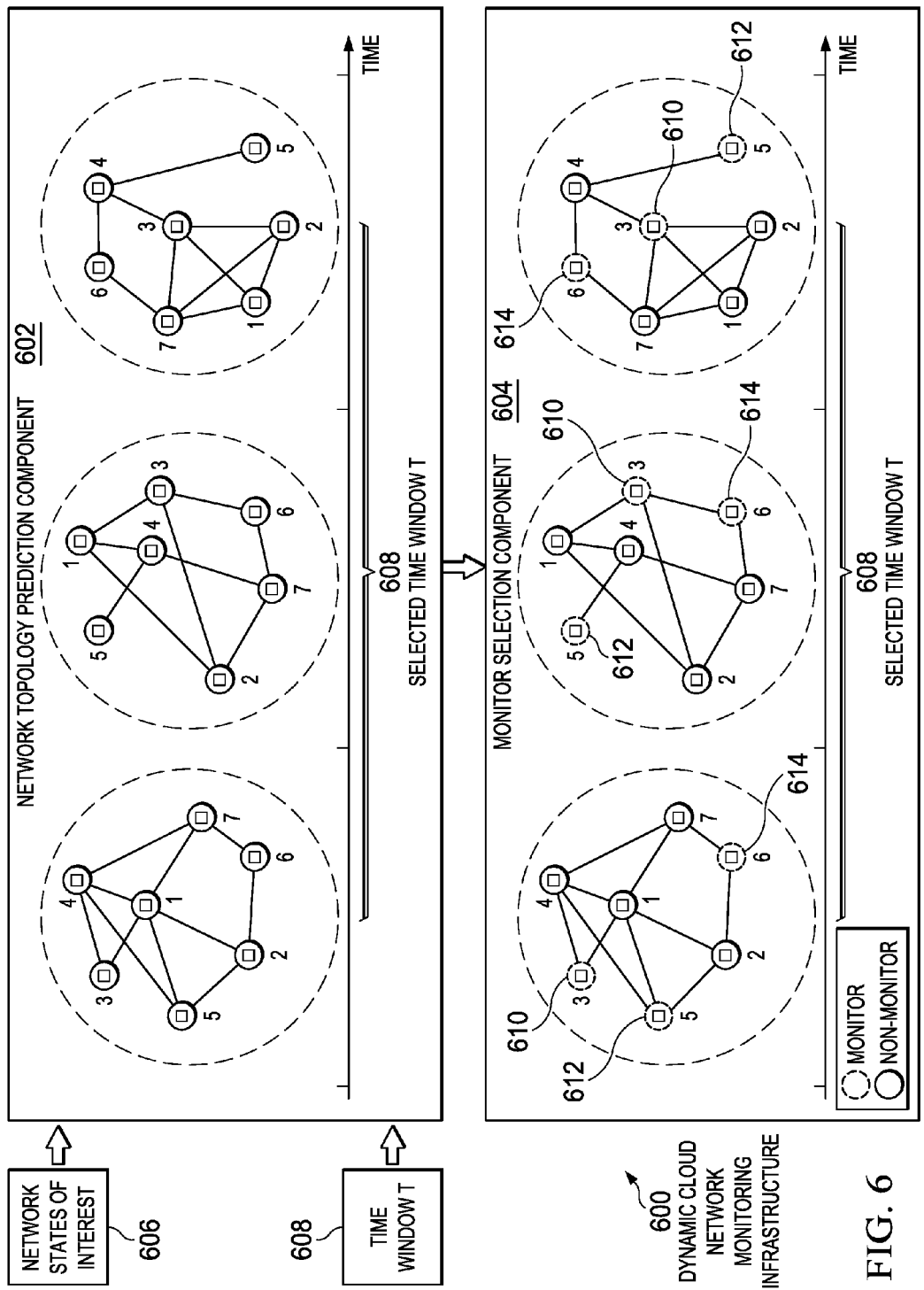
FIG. 6 is a diagram of an example of a dynamic cloud network monitoring infrastructure in accordance with an illustrative embodiment.

With reference now to FIG. 6, a diagram of an example of a dynamic cloud network monitoring infrastructure is depicted in accordance with an illustrative embodiment. Dynamic cloud network monitoring infrastructure 600 may be implemented in a data processing system, such as data processing system 200 in FIG. 2 and cloud core 504 or cloud edge 506 in FIG. 5. In this example, dynamic cloud network monitoring infrastructure 600 includes network topology prediction component 602 and monitor selection component 604. Network topology prediction component 602 generates a set of predicted network topology snapshot graphs of nodes in a dynamic cloud network within a selected look-ahead time window T. The nodes of the set of predicted network topology snapshot graphs may be, for example, nodes 234 of predicted network topology snapshot graphs 228 in FIG. 2. Monitor selection component 604 selects a subset of the nodes in the dynamic cloud network to be monitors.

Network topology prediction component 602 obtains network states of interest 606 for monitoring. For example, network owners/operators need to constantly monitor delay, jitter, or loss rates on a particular set of network links within a dynamic cloud network. To this end, the target is to ensure that network states of interest 606 on this particular set of network links are always identifiable using a set of monitors at, for example, minimum deployment cost, even if the network topology changes over time. Based on network properties, such as static or dynamic network properties, network topology prediction component 602 selects a set of one or more network topology prediction models to generate the set of predicted network topology snapshot graphs within the selected look-ahead time window T. The network topology prediction models may be, for example, network topology prediction models 224 in FIG. 2. In addition, the network topology prediction models may be based on pre-determined node trajectory constraints or historical node mobility patterns.

Depending on the given network settings, network topology prediction component 602 selects the proper set of network topology prediction models for predicting network topology snapshots of nodes within the dynamic cloud network and selects the proper size of time window T 608. A smaller time window T size increases the cost of network reconfiguration as monitors have to be frequently reselected. In contrast, a larger time window T size may cause a significant number of nodes within the dynamic cloud network to be monitors, which results in a higher monitor deployment cost. This is because monitor selection must ensure that each network link of interest is identifiable in each predicted network topology snapshot within selected time window T 608. However, network topology snapshots within selected time window T 608 may be substantially different due to changes in the dynamic cloud network. As a result, each network topology snapshot may potentially require a different set of nodes to be monitors within the dynamic cloud network. Moreover, a larger time window T size increases prediction inaccuracy. Therefore, network topology prediction component 602 takes all of these factors into account when selecting the size of time window T 608.

For example, let $G_1$, $G_2$, and $G_3$ denote the set of predicted network topology snapshot graphs within selected time window T 608. Each of the predicted network topology snapshot graphs $G_1$, $G_2$, and $G_3$ contain all network links whose network states, such as, for example, network link delay, are of interest for monitoring. Monitor selection component 604 selects a set of monitors such that all network links in the set of predicted network topology snapshot graphs $G_1$, $G_2$, and $G_3$ are identifiable using end-to-end path measurements between monitors in the dynamic cloud network. In this example, monitor selection component 604 selects node 3 610, node 5 612, and node 6 614 as monitors in the dynamic cloud network within selected time window T 608.

Figure 7:
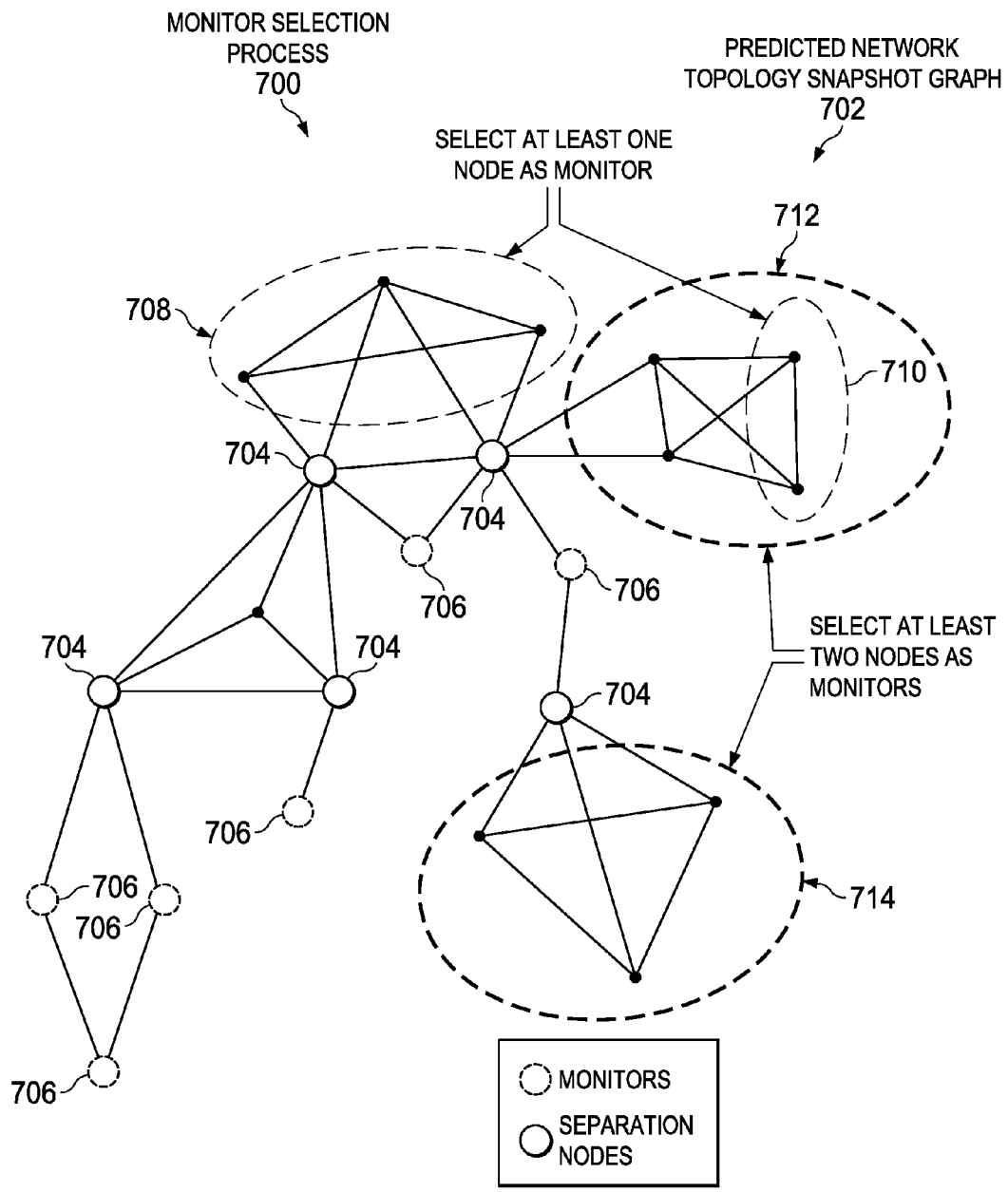
FIG. 7 is an example of a monitor selection process in accordance with an illustrative embodiment.

With reference now to FIG. 7, an example of a monitor selection process is depicted in accordance with an illustrative embodiment. Monitor selection process 700 may be implemented in a dynamic cloud network monitoring infrastructure, such as dynamic cloud network monitoring infrastructure 600 in FIG. 6. Monitor selection process 700 utilizes predicted network topology snapshot graph 702 to select a set of nodes to be monitors for monitoring network states of interest in a set of network links within a dynamic cloud network.

Monitor selection process 700 calculates the constraints that must be satisfied to ensure all network links in predicted network topology snapshot graph 702 are identifiable. For example, the most general data routing restriction in real world networks is that all paths must be cycle-free. In this regard, dangling nodes and nodes on tandem links in predicted network topology snapshot graph 702 must be monitors, otherwise, network links incident to those nodes are not measurable. Moreover, if a controllable data routing mechanism is used, then each decomposed sub-graph having certain properties, such as 3-vertex-connected, must contain at least three effective monitors. Therefore, monitor selection process 700 decomposes predicted network topology snapshot graph 702 into 3-vertex-connected sub-graphs, and calculates the monitor requirements in each sub-graph. As a result, monitor selection process 700 forms a collection of constraint pairs $(S_i, k_i)$, where for each set of nodes $S_i$, at least $k_i$ number of nodes must be monitors. Predicted network topology snapshot graph 702 illustrates that the constraint for the monitor requirements is generated based on controllable cycle-free measurement paths and conditions. Monitor selection process 700 can achieve this by solving a hitting set problem (e.g., each set of nodes corresponds to one selection constraint) using enumerations or approximation approaches.

In this example, monitor selection process 700 decomposes predicted network topology snapshot graph 702 into sub-graphs using separation nodes 704. In addition, monitor selection process 700 selects nodes 706 as monitors. Further, monitor selection process 700 determines that at least one node in sub-graph 708 and sub-graph 710 is to be selected as a monitor. Furthermore, monitor selection process 700 determines that at least two nodes in sub-graph 712 and sub-graph 714 are to be selected as monitors.

Figure 8:
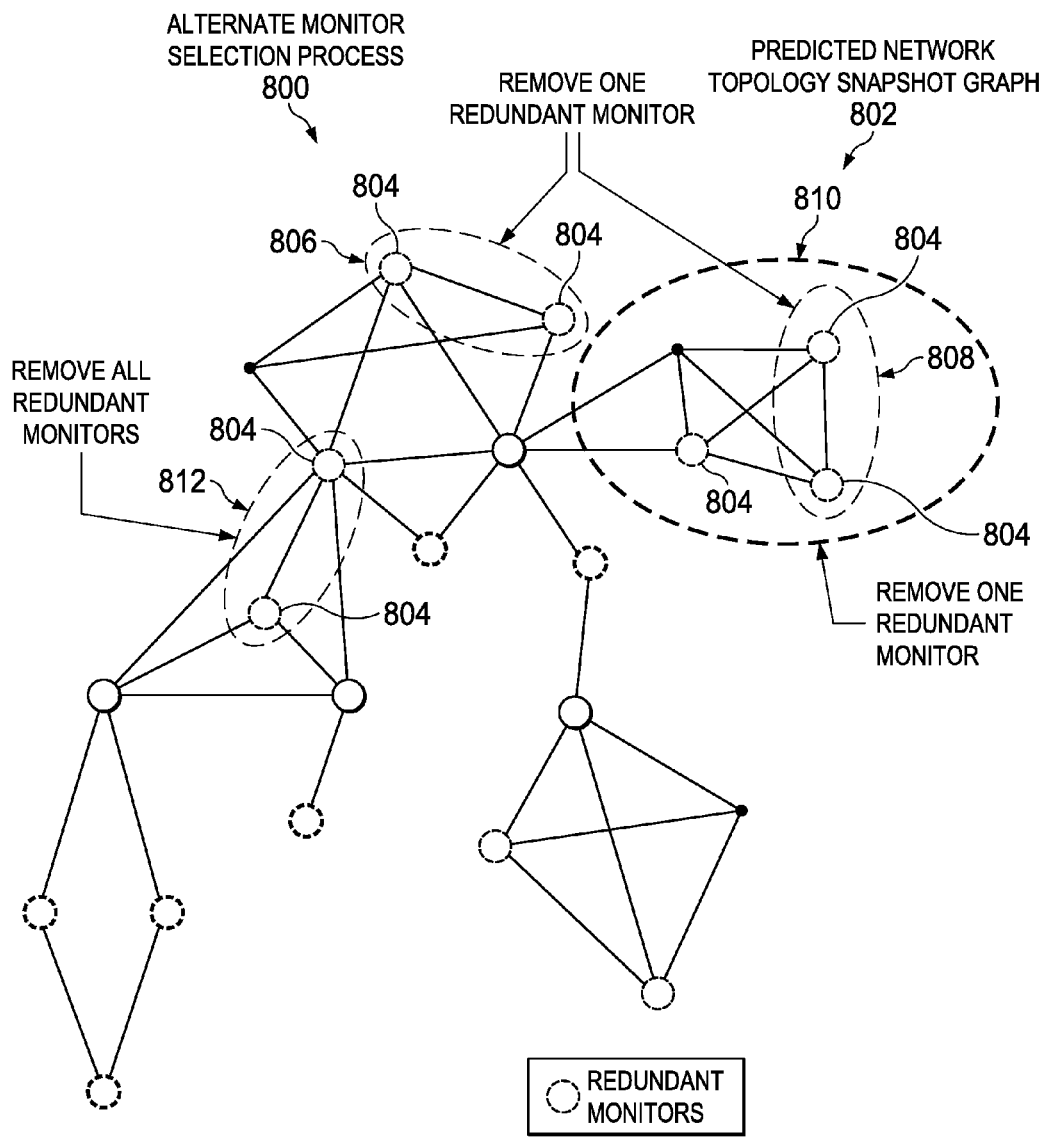
FIG. 8 is an example of an alternate monitor selection process in accordance with an illustrative embodiment.

With reference now to FIG. 8, an example of an alternate monitor selection process is depicted in accordance with an illustrative embodiment. Alternative monitor selection process 800 may be implemented in a dynamic cloud network monitoring infrastructure, such as dynamic cloud network monitoring infrastructure 600 in FIG. 6. Alternative monitor selection process 800 utilizes predicted network topology snapshot graph 802 to select a set of nodes to be monitors for monitoring network states of interest in a set of network links within a dynamic cloud network.

Alternative monitor selection process 800 selects a set of nodes to be monitors in the dynamic cloud network such that alternative monitor selection process 800 can identify all network links in a common network topology graph G' of all predicted network topology snapshot graphs $G_1, G_2, \ldots, G_n$. If a controllable cycle-free data routing mechanism is used, then alternative monitor selection process 800 can achieve sufficient monitor placement by deploying monitors only in the common network topology graph G' among predicted network topology snapshot graphs $G_1, G_2, \ldots, G_n$, so that all network links in common network topology graph G' are identifiable, where the common network topology graph G' contains link l if and only if link l appears in each predicted network topology snapshot graph $G_1, G_2, \ldots, G_n$ within a selected look-ahead time window T.

However, it should be noted that alternative monitor selection process 800 may deploy some redundant or unnecessary monitors. As a result, alternative monitor selection process 800 removes redundant monitors 804 from being monitors in the dynamic cloud network. Sparse networks (e.g., small number of network links to number of nodes ratio) tend to require more nodes to be monitors due to limited data routing options in such networks. Therefore, if alternative monitor selection process 800 removes the redundant monitors sequentially in each predicted network topology snapshot graph $G_1, G_2, \ldots, G_n$, then alternative monitor selection process 800 can first sort all predicted network topology snapshot graphs in a certain order (e.g., according to network sparsity) so that alternative monitor selection process 800 can reduce the computing complexity in monitor removal operations. To calculate the redundant monitors in each predicted network topology snapshot graph $G_1, G_2, \ldots, G_n$, alternative monitor selection process 800 can again use the canonical operation to first decompose a network into 3-vertex-connected sub-networks when a controllable cycle-free data routing mechanism is used, and then determine redundant monitors in each sub-network.

In this example, alternative monitor selection process 800 determines that one redundant monitor 804 in sub-graph 806 and sub-graph 808 is to be removed as a monitor. In addition, alternative monitor selection process 800 determines that one redundant monitor 804 in sub-graph 810 is to be removed as a monitor. Further, alternative monitor selection process 800 determines that all redundant monitors 804 in sub-graph 812 are to be removed as monitors.

Figure 9:
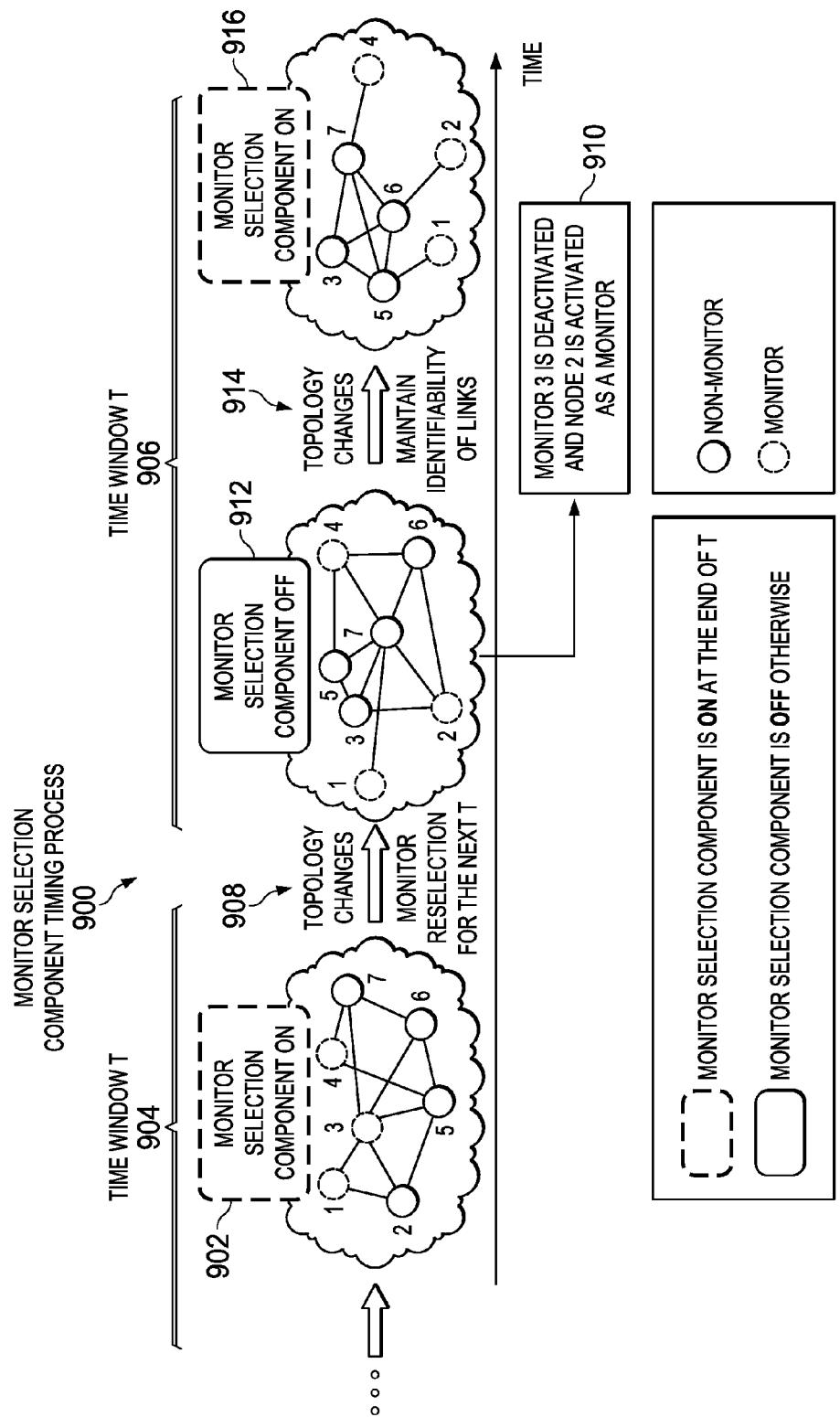
FIG. 9 is an example of a monitor selection component timing process in accordance with an illustrative embodiment.

With reference now to FIG. 9, an example of a monitor selection component timing process is depicted in accordance with an illustrative embodiment. Monitor selection component timing process 900 illustrates when a monitor selection component, such as monitor selection component 604 in FIG. 6, is turned ON and selecting dynamic cloud network nodes as monitors or is turned OFF and not selecting dynamic cloud network nodes as monitors. The monitor selection component is turned ON and working at 902, which is at the end of the time period corresponding to time window 904 and the beginning of the time period corresponding to next time window 906.

In this example, nodes 1, 3, and 4 are monitors in the dynamic cloud network at the end of the time period corresponding to time window 904. The monitor selection component previously selected nodes 1, 3, and 4 to be monitors at the beginning of time window 904 to ensure that a set of network links of interest, such as set of network links of interest 234 in FIG. 2, between nodes of the dynamic cloud network are always identifiable throughout time window 904. Because the topology of the dynamic cloud network changes at 908, the monitor selection component, which is currently ON, performs monitor reselection for next time window 906. Now, because of the topology changed, the monitor selection component deactivates node 3 as a monitor and activates node 2 to be a monitor at 910 to ensure that the set of network links of interest are identifiable throughout next time window 906.

After the start of next time window 906, the monitor selection component turns OFF at 912. Now, nodes 1, 2, and 4 are monitors in the dynamic cloud network during time window 906. Even though at 914 the topology of the dynamic cloud network changes again during time window 906, the identifiability of the set of network links of interest is maintained throughout time window 906. At the end of time window 906, the monitor selection component turns back ON at 916 and determines whether monitor node reselection is necessary for the next time window.

Figure 10:
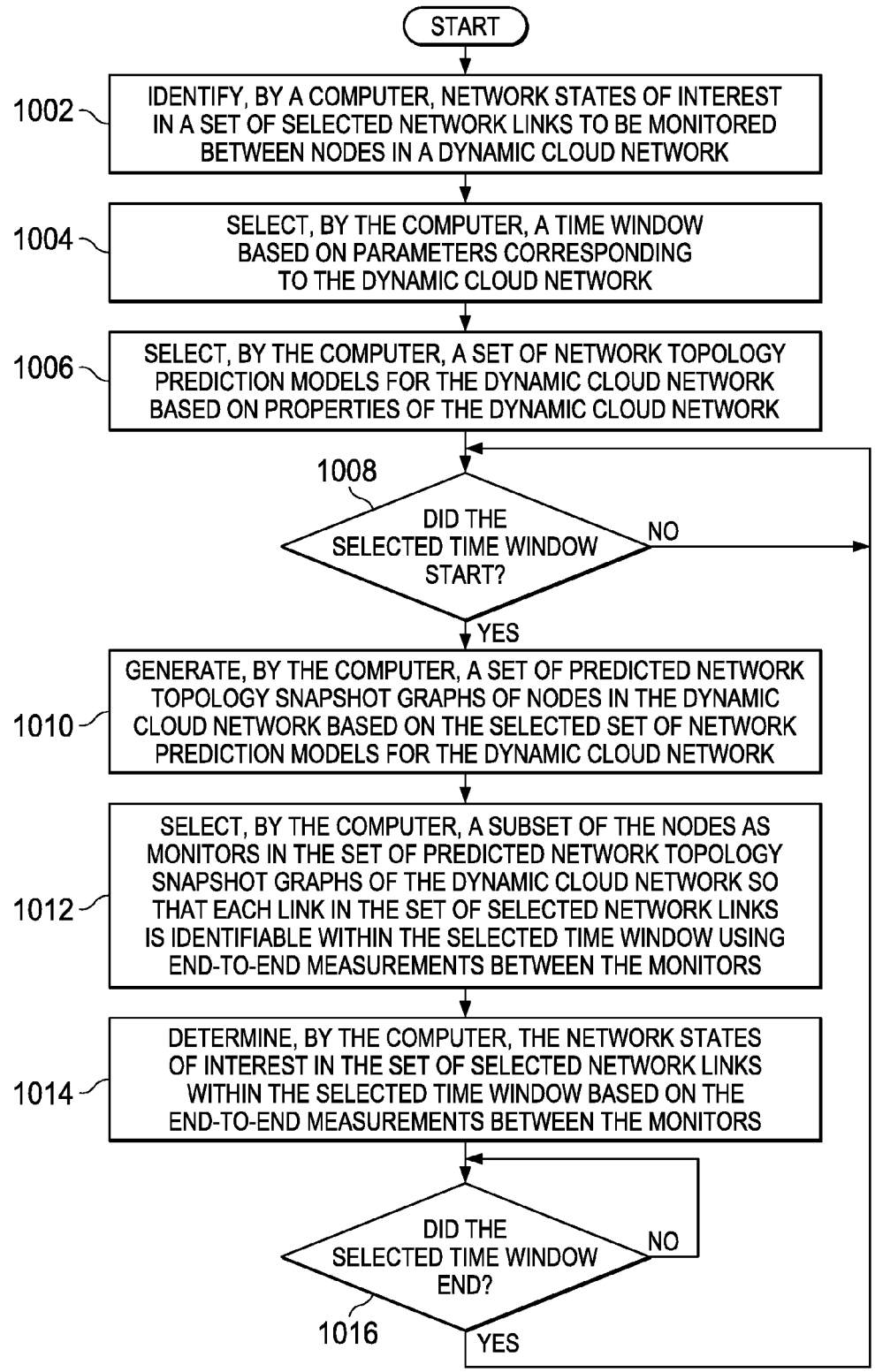
FIG. 10 is a flowchart illustrating a process for monitoring a dynamic cloud network in accordance with an illustrative embodiment.

With reference now to FIG. 10, a flowchart illustrating a process for monitoring a dynamic cloud network is shown in accordance with an illustrative embodiment. The process shown in FIG. 10 may be implemented in a computer, such as, for example, server 104 or a data processing system of client 110 in FIG. 1 and data processing system 200 in FIG. 2. In addition, the process shown in FIG. 10 may be implemented in a cloud or a cloud edge, such as, for example, cloud 502 or cloud edge 506 in FIG. 5.

The process begins when the computer identifies network states of interest in a set of selected network links to be monitored between nodes in a dynamic cloud network (step 1002). In addition, the computer selects a time window based on parameters corresponding to the dynamic cloud network (step 1004). Further, the computer selects a set of network topology prediction models for the dynamic cloud network based on properties of the dynamic cloud network (step 1006).

Subsequently, the computer makes a determination as to whether the selected time window started (step 1008). If the computer determines that the selected time window did not start, no output of step 1008, then the process returns to step 1008 where the computer waits for the selected time window to start. If the computer determines that the selected time window did start, yes output of step 1008, then the computer generates a set of predicted network topology snapshot graphs of nodes in the dynamic cloud network based on the selected set of network prediction models for the dynamic cloud network (step 1010).

Afterward, the computer selects a subset of the nodes as monitors in the set of predicted network topology snapshot graphs of the dynamic cloud network so that each link in the set of selected network links is identifiable within the selected time window using end-to-end measurements between the monitors (step 1012). The computer also determines the network states of interest in the set of selected network links within the selected time window based on the end-to-end measurements between the monitors (step 1014). Subsequently, the computer makes a determination as to whether the selected time window ended (step 1016). If the computer determines that the selected time window did not end, no output of step 1016, then the process returns to step 1016 where the computer waits for the selected time window to end. If the computer determines that the selected time window did end, yes output of step 1016, then the process returns to step 1008 where the computer waits for the next time window to start. Alternatively, the process may return to step 1002 after the computer determines that the selected time window ended to identify a set of network links to monitor, select a time window, and select a set of network topology prediction models based on changes in the dynamic cloud network.

Thus, illustrative embodiments of the present invention provide a computer-implemented method, computer system, and computer program product for monitoring network states of interest in a set of selected network links between mobile data processing nodes in a dynamic cloud network based on end-to-end measurements between monitors with network topologies changing over time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for monitoring a dynamic cloud network, the computer-implemented method comprising:
generating, by a computer, a set of predicted network topology snapshot graphs that estimate locations of a set of mobile nodes in the dynamic cloud network based on a set of network topology prediction models predicting a topology of the set of mobile nodes comprising the dynamic cloud network;
selecting, by the computer, a subset of mobile nodes from the set of mobile nodes comprising the dynamic cloud network as monitors in the set of predicted network topology snapshot graphs of the dynamic cloud network so that each link in a set of selected network links is identifiable using end-to-end measurements between the monitors;
monitoring, by the computer, the set of selected network links in the dynamic cloud network using the end-to-end measurements between the monitors;

determining, by the computer, network states of interest in the set of selected network links within a selected time window based on the monitoring of the end-to-end measurements between the monitors; and reconfiguring, by the computer, the dynamic cloud network based on the network states of interest in the set of selected network links being greater than or equal to predefined network state threshold values during a time period corresponding to the selected time window.

2. The computer-implemented method of claim 1 further comprising:

identifying, by the computer, delay, jitter, and loss rates as the network states of interest in the set of selected network links to be monitored between the set of mobile nodes in the dynamic cloud network.

3. The computer-implemented method of claim 1, wherein the computer selects a size of the selected time window based on network operation cost to deploy the monitors in the dynamic cloud network, network reconfiguration cost to reconfigure the dynamic cloud network, and network topology prediction accuracy in predicting the topology of the dynamic cloud network.

4. The computer-implemented method of claim 1, wherein the computer selects the set of network topology prediction models for the dynamic cloud network based on knowledge of network dynamics in a dynamic wireless network comprising a plurality of mobile data processing nodes.

5. The computer-implemented method of claim 1 further comprising:

detecting, by the computer, changes over time in the topology of the dynamic cloud network as a plurality of mobile data processing nodes comprising the dynamic cloud network move within the dynamic cloud network.

6. The computer-implemented method of claim 5, wherein the plurality of mobile data processing nodes comprise a cloud edge around a cloud core of the dynamic cloud network, and wherein a subset of the plurality of mobile data processing nodes comprising the cloud edge form an ad hoc cloud by wirelessly connecting to one another to perform a set of one or more data processing tasks.

7. The computer-implemented method of claim 5, wherein the plurality of mobile data processing nodes are at least one of smart phones, smart watches, handheld computers, laptop computers, personal digital assistants, and gaming devices.

8. The computer-implemented method of claim 1 further comprising:

identifying, by the computer, sub-graphs of nodes in the set of predicted network topology snapshot graphs to monitor.

9. The computer-implemented method of claim 1, wherein the computer selects the monitors in the set of predicted network topology snapshot graphs based on number of monitors, speed of computation, overhead incurred by monitoring, and stability of the monitors during future network topology changes.

10. The computer-implemented method of claim 1, wherein the set of network topology prediction models are based on trajectory constraints of the set of mobile nodes comprising the dynamic cloud network.

11. The computer-implemented method of claim 1, wherein the end-to-end measurements between the monitors are end-to-end network path performance that is an accumulation of corresponding link metrics between a set of monitors.

12. The computer-implemented method of claim 1, wherein the computer turns ON a monitor selection component to select the subset of mobile nodes as the monitors at an end of a period of time corresponding to a previous selected time window or at a beginning of a period of time corresponding to the selected time window and the computer turns OFF the monitor selection component during the selected time window until an end of the period of time corresponding to the selected time window when the computer again turns on the monitor selection component to select a new set of monitors for a next selected time window.

13. A computer system for monitoring a dynamic cloud network, the computer system comprising:

a bus system;

a storage device connected to the bus system, wherein the storage device stores program instructions; and a processor connected to the bus system, wherein the processor executes the program instructions to:

generate a set of predicted network topology snapshot graphs that estimate locations of a set of mobile nodes in the dynamic cloud network based on a set of network topology prediction models predicting a topology of the set of mobile nodes comprising the dynamic cloud network;

select a subset of mobile nodes from the set of mobile nodes comprising the dynamic cloud network as monitors in the set of predicted network topology snapshot graphs of the dynamic cloud network so that each link in a set of selected network links is identifiable using end-to-end measurements between the monitors;

monitor the set of selected network links in the dynamic cloud network using the end-to-end measurements between the monitors;

determine network states of interest in the set of selected network links within a selected time window based on monitoring the end-to-end measurements between the monitors; and reconfigure the dynamic cloud network based on the network states of interest in the set of selected network links being greater than or equal to predefined network state threshold values during a time period corresponding to the selected time window.

14. The computer system of claim 13, wherein the processor further executes the program instructions to:

identify delay, jitter, and loss rates as the network states of interest in the set of selected network links to be monitored between the set of mobile nodes in the dynamic cloud network.

15. A computer program product for monitoring a dynamic cloud network, the computer program product comprising a computer readable storage medium having program instructions embodied therewith, the program instructions executable by a computer to cause the computer to perform a method comprising:

generating, by the computer, a set of predicted network topology snapshot graphs that estimate locations of a set of mobile nodes in the dynamic cloud network based on a set of network topology prediction models predicting a topology of the set of mobile nodes comprising the dynamic cloud network;

selecting, by the computer, a subset of mobile nodes from the set of mobile nodes comprising the dynamic cloud network as monitors in the set of predicted network topology snapshot graphs of the dynamic cloud network so that each link in a set of selected network links is identifiable using end-to-end measurements between the monitors;

monitoring, by the computer, the set of selected network links in the dynamic cloud network using the end-to-end measurements between the monitors;

determining, by the computer, network states of interest in the set of selected network links within a selected time window based on the monitoring of the end-to-end measurements between the monitors; and reconfiguring, by the computer, the dynamic cloud network based on the network states of interest in the set of selected network links being greater than or equal to predefined network state threshold values during a time period corresponding to the selected time window.

16. The computer program product of claim 15 further comprising:

identifying, by the computer, delay, jitter, and loss rates as the network states of interest in the set of selected network links to be monitored between the set of mobile nodes in the dynamic cloud network.

17. The computer program product of claim 15, wherein the computer selects a size of the selected time window based on network operation cost to deploy the monitors in the dynamic cloud network, network reconfiguration cost to reconfigure the dynamic cloud network, and network topology prediction accuracy in predicting the topology of the dynamic cloud network.

18. The computer program product of claim 15, wherein the computer selects the set of network topology prediction models for the dynamic cloud network based on knowledge of network dynamics in a dynamic wireless network comprising a plurality of mobile data processing nodes.

19. The computer program product of claim 15 further comprising:

detecting, by the computer, changes over time in the topology of the dynamic cloud network as a plurality of mobile data processing nodes comprising the dynamic cloud network move within the dynamic cloud network.

20. The computer program product of claim 19, wherein the plurality of mobile data processing nodes comprise a cloud edge around a cloud core of the dynamic cloud network, and wherein a subset of the plurality of mobile data processing nodes comprising the cloud edge form an ad hoc cloud by wirelessly connecting to one another to perform a set of one or more data processing tasks.

* * * * *